United States Patent [19]

Heflinger et al.

[11] Patent Number: 5,721,877
[45] Date of Patent: Feb. 24, 1998

[54] METHOD AND APPARATUS FOR LIMITING ACCESS TO NONVOLATILE MEMORY DEVICE

[75] Inventors: Kenneth A. Heflinger, Orange; Sanjay Aiyar, Anaheim, both of Calif.

[73] Assignee: AST Research, Inc., Irvine, Calif.

[21] Appl. No.: 457,518

[22] Filed: May 31, 1995

[51] Int. Cl.$^6$ ............................... G06F 3/00; H04L 9/00
[52] U.S. Cl. ..................... 395/500; 395/490; 395/479; 395/410; 380/4; 380/25
[58] Field of Search ..................... 395/500, 430, 395/650, 490, 471, 472, 800, 842, 410–412, 479, 494, 750, 726, 733, 740, 742, 186; 380/4, 3, 23, 24, 25, 49, 50; 340/825.31, 825.34; 235/379–382; 365/189.07, 195, 228

[56] References Cited

U.S. PATENT DOCUMENTS

| | | | |
|---|---|---|---|
| 4,519,032 | 5/1985 | Mendell | 395/650 |
| 4,521,852 | 6/1985 | Guttag | 395/490 |
| 4,521,853 | 6/1985 | Guttag | 395/490 |
| 4,590,552 | 5/1986 | Guttag et al. | 395/490 |
| 4,959,860 | 9/1990 | Watter et al. | 380/4 |
| 5,027,317 | 6/1991 | Pepera et al. | 395/490 |
| 5,084,843 | 1/1992 | Mitsuishi et al. | 365/218 |
| 5,206,938 | 4/1993 | Fujioka | 380/4 |
| 5,371,793 | 12/1994 | Kimura | 395/410 |
| 5,392,290 | 2/1995 | Brown et al. | 395/182.04 |
| 5,406,508 | 4/1995 | Hayashibara | 365/49 |
| 5,469,557 | 11/1995 | Salt et al. | 395/430 |
| 5,475,829 | 12/1995 | Thome | 395/479 |
| 5,511,204 | 4/1996 | Crump et al. | 395/750 |
| 5,586,286 | 12/1996 | Santeler et al. | 395/494 |
| 5,586,301 | 12/1996 | Fisherman et al. | 395/490 |
| 5,596,741 | 1/1997 | Thome | 395/490 |
| 5,623,673 | 4/1997 | Gephardt et al. | 395/733 |

OTHER PUBLICATIONS

VLSI VL82C591 Preliminary Device Functional Specification –Specifically Section 5.4.3.3. Nov. 1993.

Primary Examiner—Jacques Louis-Jacques
Attorney, Agent, or Firm—Knobbe, Martens, Olson & Bear, LLP

[57] ABSTRACT

A method and apparatus for limiting access to a nonvolatile memory device by inserting access limiting circuitry between CPU generated read and write command signals being sent to the nonvolatile memory device and the nonvolatile memory device itself such that write commands can be received and executed by the nonvolatile memory device only when the CPU is in a System Management Mode, and such that read commands for protected addresses can be received and executed by the nonvolatile memory device only when the CPU is in the System Management Mode, but is still able receive and executed read commands for nonprotected addresses regardless of the mode of the CPU. This feature can also be provided for the write command. The access limiting circuitry is therefore capable of preventing a virus program, or a malfunctioning operating system, from undesirably altering data in the nonvolatile memory device since the operating system is preempted when the CPU is in the System Management Mode.

18 Claims, 1 Drawing Sheet

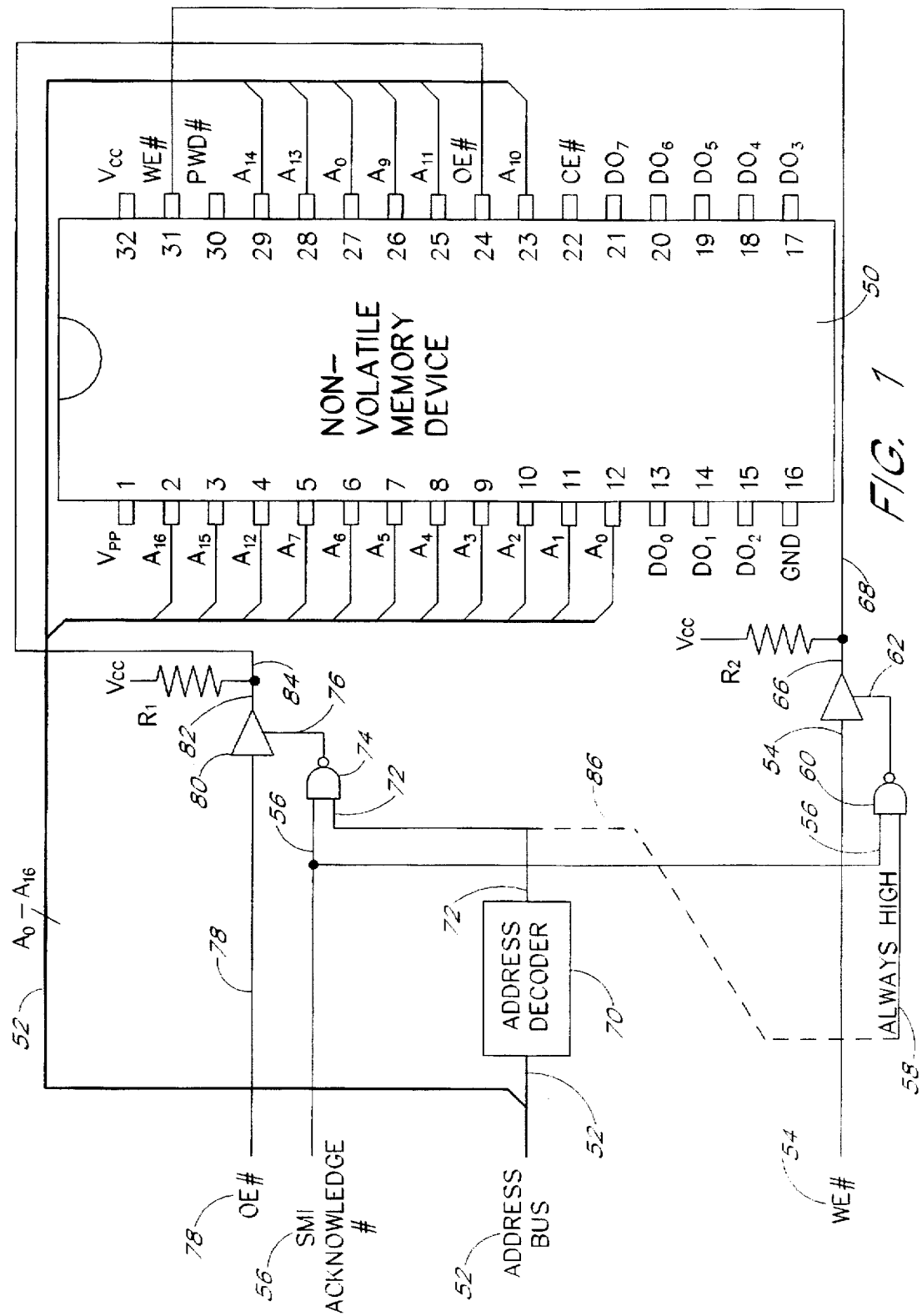

METHOD AND APPARATUS FOR LIMITING ACCESS TO NONVOLATILE MEMORY DEVICE

FIELD OF THE INVENTION

This invention relates to computer systems, and more specifically to a method and apparatus for limiting access to a nonvolatile memory device by controlling when read and write commands are forwarded to the nonvolatile memory device for execution.

BACKGROUND OF THE INVENTION

Most computer systems manufactured and sold today have a Basic Input/Output System (BIOS) which is typically stored in a nonvolatile flash memory device on the motherboard of the computer system. A flash memory device is a type of high-density nonvolatile semiconductor memory that offers fast access times along with the ability to be reprogrammed without being removed from the computer system, and is therefore desirable for uses requiring frequent programming since they can be electrically erased and rewritten many times. However, a flash memory device can also be bulk-erased in seconds. Thus, undesired access to the flash memory device for a few seconds could result in the erasure and/or rewriting of the data stored in the flash memory device. In addition to the BIOS, additional data such as peripheral "plug and play" data may be stored in the flash memory device as well.

As is known and understood by persons of ordinary skill in the art, the nonvolatile memory is accessed by a Central Processing Unit (CPU) for various purposes during operation of the computer system. The term "access" is used herein to describe the ability to send read, write, erase, and rewrite commands to the nonvolatile memory device for execution. Typically, write commands are preceded by an erase command comprising a predetermined data string.

These access commands to the nonvolatile memory device are typically initiated by the operating system software. However, providing operating system control over access to the nonvolatile memory device may cause certain problems. For example, if a software virus is present, or if the operating system is malfunctioning, it is possible that the virus may intentionally access the nonvolatile memory device by requesting the operating system to do so, or it is possible that the malfunctioning operating system may accidentally access the nonvolatile memory device, both of which could cause loss or damage to the existing data.

Therefore, it is desirable to prevent maliciously intentional, or accidental, erasures of and rewrites to the nonvolatile memory device. Furthermore, in certain situations, it is desirable to prevent the execution of read commands from certain portions of the nonvolatile memory device as well. For example, although certain data in the nonvolatile memory device must be made available to the operating system software, other data may need to be protected from maliciously intentional or accidental reads. For example, a user's password may be stored in the nonvolatile memory device, and it is desirable to be able to restrict access to this data in some way.

A prior art solution to some of the above mentioned problems has been to allow access to the nonvolatile memory device only if a "proprietary command" is inputted to the keyboard controller. Once this command is received, the keyboard controller "unlocks" the nonvolatile memory device, thereby providing access to it. A problem with this approach is that once the nonvolatile memory device is unlocked, the operating system is still in control. In other words, if a virus is programmed to do so, or if the operating system malfunctions in a certain way, the unlocked nonvolatile memory device is still vulnerable to maliciously intentional or accidental access, and the operating system can send undesired read, write and/or erase and rewrite commands to the nonvolatile memory device for execution.

Another problem with the prior art solution mentioned above is that the operating system may interfere with the process of sending the "proprietary command" to the keyboard controller by interrupting the process and attempting to communicate with the keyboard controller. The keyboard controller commands are multiple byte sequences sent from the host Central Processing Unit (CPU) to the keyboard controller in a specific sequence. The operating system sends commands and receives data from the keyboard controller to perform such functions as reading keystrokes from the keyboard, and various other functions. Because the operating system remains in control of the system, it may attempt to communicate with the keyboard controller while the multiple byte sequence to "unlock" the nonvolatile memory device is taking place. This will cause the keyboard to receive part of the proprietary unlock command and part of the operating system's command, thus confusing the keyboard controller, and making the results unpredictable. This makes it impossible to reliably send a proprietary command to the keyboard controller to unlock the device.

Therefore, a better solution is needed to limit access, and prevent operating system control over access, to the nonvolatile memory device without increasing the likelihood of crashing the system due to keyboard controller conflicts.

SUMMARY OF THE INVENTION

A method and apparatus of the present invention for limiting access to a nonvolatile memory device provides a way to prevent unauthorized access to the nonvolatile memory device, and is designed not to increase the likelihood of crashing the system due to keyboard controller conflicts.

The method and apparatus of the present invention is implemented by taking a read or a write command signal (read/write) being sent from a core logic to the nonvolatile memory device and logically combining that signal with an SMIACK (System Management Interrupt Acknowledge) signal, which indicates that the CPU is in the System Management Mode, in such a way so as to prevent forwarding of the read/write command signal to the nonvolatile memory device unless the read/write command signal and the SMIACK signal are both "active".

Core logic is used to generate various signals on the motherboard in order to control various components. One of these components is the nonvolatile memory device that holds the system BIOS code, and in certain cases the "plug and play" code. The signals created by the core logic include the memory read, memory write, chip enable, and power down signals to the nonvolatile memory device. All computer systems have some form of core logic in them. In the early days of the computer industry, the core logic was referred to as the "control unit" or the "sequencer".

In a preferred embodiment, the active state is represented by a logical zero, or a low state. In other words, a read/write command signal which is sent to the nonvolatile memory device when the CPU is not in the System Management Mode will be prevented from reaching the nonvolatile memory device. Only read/write command signals sent to the nonvolatile memory device while the system is in the System Management Mode will be received by the nonvolatile memory device and executed. However, read commands sent for non-protected addresses in the nonvolatile memory device are allowed to be received by the nonvolatile memory device even if the CPU is not in the System Management Mode.

This unique approach provides benefits previously unavailable in the prior art. First, since the System Management Mode interrupts the operating system, the operating system no longer has control over access to the nonvolatile memory device. Therefore, a virus or a malfunctioning operating system cannot intentionally or accidentally alter the data stored in the nonvolatile memory device. Second, since the keyboard controller is not being used to "unlock" the nonvolatile memory device, there are no potential conflicts raised between the operating system communicating with the keyboard controller and the unlocking mechanism.

By implementing access limiting circuitry between the read/write command signals and the pins of the nonvolatile memory device, variations in the level of access to the nonvolatile memory device can be achieved. For example, read commands can be limited only to certain non-protected addresses of the nonvolatile memory device, with System Management Mode status required before certain protected addresses of the nonvolatile memory device can be read. Another example is to implement access limiting circuitry to prevent all erase/rewrite or write commands from being forwarded to the nonvolatile memory device unless the CPU is in the System Management Mode.

Accordingly, it is an object of the present invention to provide an improved method and apparatus for limiting access to a nonvolatile memory device.

It is a further object of the present invention to limit access to the nonvolatile memory device so that write commands are forwarded to the nonvolatile memory device only during System Management Mode for execution.

An additional object of the present invention is to limit access to certain protected addresses of the nonvolatile memory device so that read commands from these certain addresses are forwarded to the nonvolatile memory devices for execution only during the System Management Mode.

Another object of the present invention is to provide a method of limiting access to the nonvolatile memory device in various degrees by modifying the design of the access limiting circuitry which is placed between various CPU generated command signals being sent to the nonvolatile memory device and the nonvolatile memory device itself.

Further objects and advantages of the present invention will become apparent from a consideration of the drawings and ensuing description.

BRIEF DESCRIPTION OF THE DRAWINGS

FIG. 1 is a circuit diagram illustrating access limiting circuitry connected between CPU generated read and write command signals being sent to a nonvolatile memory device and the pins of a dual-in-line package (DIP) nonvolatile flash memory device.

DETAILED DESCRIPTION OF A PREFERRED EMBODIMENT

FIG. 1 is a circuit diagram illustrating access limiting circuitry connected between CPU (not shown) generated read and write command signals being sent to a nonvolatile memory device 50 and the pins of a dual-in-line package (DIP) nonvolatile flash memory device 50. In a preferred embodiment, the nonvolatile memory device 50 is an Intel® 28F001Bx 1MB flash memory device comprising 32 pins. Each pin name or function is discussed below in conjunction with its corresponding pin number. For example, Vpp 1 is pin 1 and is usually tied to a 12 volt power supply, GND 16 is pin 16 and is usually tied to the ground plane on the motherboard, and Vcc 32 is pin 32 and is usually tied to a 5 volt power supply.

The nonvolatile memory device 50 is typically placed in communication with an address bus 52 having seventeen address lines labeled $A_0$–$A_{16}$ which is connected to pins 2–12, 23, and 25–29, as shown in FIG. 1. The nonvolatile memory device 50 is also capable of being connected to a data bus (not shown) having eight data lines labeled $DO_0DO_7$, which is capable of being connected to pins 13–15 and 17–21. It is to be understood that a person of ordinary skill in the art is capable of implementing these data line pins into a typical motherboard. Accordingly, these data lines, as well as certain other connections, are not shown in FIG. 1 so that the access limiting circuitry of the present invention can be more clearly shown and discussed.

In addition to the above mentioned pins, there is a chip enable CE# 22 pin, an output enable OE# 24 pin, a power down PWD#30 pin, and a write enable WE# 31 pin. The "#" on these labels signify that these pins are active low, rather than active high.

In other words, to write enable the nonvolatile memory device 50, a logical zero must be present on the WE# 31 pin. If a logical one is present on the WE# 31 pin, then the write enable function will not be enabled. The connection and operation of these "enable" pins, sometimes referred to as "command signals", are well known to those of ordinary skill in the art, and are therefore discussed below without further explanation.

It is to be understood that the method and apparatus of the present invention for limiting access to the nonvolatile memory device 50 can be implemented using a number of various circuit configurations to achieve the same operational and functional result.

For example, to achieve a desired function or operation from a circuit, the desired circuit may be designed to make use of the available components or logical elements in various chips already on a specific circuit board, rather than designing the circuit from scratch and requiring the addition of components not available on the specific circuit board. In a preferred embodiment, the logic elements of the access limiting circuitry of FIG. 1 are utilized to implement the desired circuit based upon elements readily available to the designers. It is to be understood that the nonvolatile memory devices of various computer manufacturers may be designed more efficiently using different logic elements to perform the same function by a person of ordinary skill in the art.

Although variations of a given circuit can be designed by a person of ordinary skill in the art, the concepts and teachings of the present invention are novel, and as such, the placement of access limiting circuitry between various command signals being sent from the CPU (not shown) to the pins of the nonvolatile memory device 50 provides benefits not found in the prior art.

Typically, a write enable signal and a read enable signal coming from the CPU enables the CPU to read and write data to and from the nonvolatile memory device 50. As discussed previously, there are certain disadvantages to such a configuration. Accordingly, the method and apparatus of the present invention requires that the CPU be in a System Management Mode prior to forwarding write commands, as well as read commands for protected addresses, to the nonvolatile memory device 50 for execution.

Since the write enable WE# 31 pin and the read or equivalent output enable OE# 24 pin are labeled with a "#", the write enable and the output enable functions will only be active when a low state or a logical zero is present on these pins. Accordingly, when there is no request for a write or output (read) command, pins 31 and 24 respectively will sense a high state or logical one.

It is to be understood that with the novel objectives of the present invention in mind, a person of ordinary skill in the art will be able to analyze the circuit diagram of FIG. 1 and understand the operation of the circuit necessary to implement the desired goals of the present invention, namely, to prevent writes to the nonvolatile memory device 50 unless the CPU is in the System Management Mode, and to prevent reads from protected addresses within the nonvolatile memory device 50 unless the CPU is in the System Management Mode, while still allowing reads from unprotected addresses when not in the System Management Mode.

WRITE COMMAND CIRCUITRY:

One of the objectives of the present invention is to provide access limiting circuitry that will only forward write enable commands to the nonvolatile memory device 50 when the CPU is in the System Management Mode. This is accomplished in the following way.

In a preferred embodiment, an SMI acknowledge (SMIACK) signal is generated by the CPU when the CPU is in the System Management Mode. The SMI acknowledge signal is labeled SMIACK# 56 and is active low. In other words, if SMIACK# 56 is a logical zero or in a low state, then that means that the CPU is in the System Management Mode, and if SMIACK# 56 is a logical one or in a high state, then that means that the CPU is not in the System Management Mode.

If a write command is generated, then the WE# 54 signal goes from an inactive high state to an active low state. Previously, the active low state WE# 54 command signal would go all the way to the WE# 31 pin of the nonvolatile memory device without interruption, thereby enabling the write command. In the present invention, however, the active low state WE# 54 command signal is inputted into a first switch 64, and the SMIACK# 56 signal is inputted into a first NAND gate 60. The other input 58 to the NAND gate 60 is always tied to a logical one, or a high state. Therefore, if SMIACK# 56 is low, i.e. the CPU is in the System Management Mode, then a low state signal at line 56 and a high state signal at line 58 is inputted to the NAND gate 60 which provides a high output at line 62. If line 62 is high, then the line 62 input to the first switch 64 is high. When the line 62 input to the first switch 64 is high, then the WE# 54 command signal passes through to the nonvolatile memory device 50 as if the first switch 64 were a short between line 54 and line 66. Accordingly, whenever the CPU is in the System Management Mode, the WE# 54 command signal is passed through the first switch 64 to line 66 and then to line 68 and then provided as an input to the WE# 31 pin.

If the SMIACK# 56 signal is in a high state, i.e. the CPU is not in the System Management Mode, then the high state signal at line 56 and the high state signal at line 58 are inputted to the NAND gate 60 which provides a low state output on line 62. If line 62 is a low state signal input to the first switch 64, then output line 66 from the switch 64 is in effect disconnected and resistor R2 in conjunction with the voltage from Vcc pulls up line 68 to a high state, or a logical one, thereby preventing the write enable pin WE# 31 from being activated. Therefore, when the CPU is not in the System Management Mode, i.e. SMIACK# 56 is in a high state, it doesn't matter whether the CPU is sending an active low or inactive high WE# 54 signal. The nonvolatile memory device 50 will only receive an inactive high signal at the WE# 31 pin.

READ OR OUTPUT ENABLE COMMAND CIRCUITRY:

Another objective of the present invention is to provide access limiting circuitry that will only forward read enable or output enable commands for protected addresses to the nonvolatile memory device 50 when the CPU is in the System Management Mode, but will forward read enable or output enable commands for non-protected addresses even if the CPU is not in the System Management Mode. An address decoder 70 is designed to provide a high state output at line 72 if the requested address at address bus 52 is a protected address, and to provide a low state output at line 72 if the requested address at address bus 52 is a non-protected address.

If SMIACK# 56 is in a high state, i.e. the CPU is not in System Management Mode, and a requested address on the address bus input 52 to the address decoder 70 is a protected address, then the inputs to NAND gate 74 are the high state signal 56 and the high state signal 72, which results in a low state NAND gate 74 output on line 76. As similarly discussed above, a low state signal on line 76 inputted to a second switch 80 in effect disconnects the second switch 80 output line 82 from input line 78. The resistor R1 in conjunction with the voltage from Vcc pulls line 84 to a high state, thereby providing an inactive high state signal to the OE# 24 pin. Thus, a request for output is not enabled if the CPU is not in the System Management Mode and the request is for a protected address.

If the requested address is not protected such that output 72 is in a low state, then regardless of the state of signal 56, the NAND gate 74 provides a high state signal at the output line 76. The high state line 76 is provided as an input to the second switch 80. A high state signal on line 76 to the second switch 80 allows the OE# 78 signal to pass through the second switch 80 to the nonvolatile memory device 50, and to the OE# 24 pin. If the OE# 78 signal is low, i.e. active, then the read enable or output enable to the nonvolatile memory device 50 is activated. In other words, even if the CPU is not in the System Management Mode, if the output request is for a non-protected address, the request will be forwarded to the nonvolatile memory device 50.

If SMIACK# 56 is low, i.e. the CPU is in System Management Mode, then regardless of whether input 72 is in a high state or low state, the low state input 56 to the NAND gate 74 will provide a high state output signal 76 as an input to the second switch 80, thereby allowing the OE# 78 signal to pass through. This is true for both protected and non-protected addresses.

It is to be understood that the output 72 from the address decoder 70 cab be connected to the input 58 of the first NAND gate 60 with a line 86 shown as a dotted line in FIG. 1. In this way, the same flexibility available for read commands are also made available for write commands. For example, if line 86 is included in the circuit, the write command circuitry is now designed to allow write commands for non-protected addresses to be forwarded to the nonvolatile memory device 50 regardless of whether the CPU is in the System Management Mode. However, the write command will not be forwarded to the nonvolatile memory device 50 if the write command is for protected addresses unless the CPU is in the System Management Mode.

Accordingly, by providing access limiting circuitry between CPU generated command signals being sent to the nonvolatile memory device and the nonvolatile memory device itself, the present invention provides benefits not previously available in the prior art.

While the above description contains many specificities, these should not be construed as limitations on the scope of the invention, but rather as an exemplification of preferred embodiments thereof. Many other variations are possible. For example, access for purposes other than writing or outputting data to and from the nonvolatile memory device can be controlled and limited according to the desires of a circuit designer by implementing the teachings of the present invention. In addition, various equivalent circuits can be designed to perform the objectives of the present invention. Any circuit designed to perform the basic objectives of the present invention are expressly contemplated by the disclosure of this specification.

What is claimed is:

1. An apparatus for limiting access to a nonvolatile memory device in a computer system, said apparatus comprising:

a circuit responsive to a system management mode signal from a central processing unit in said computer system, said circuit receiving a signal being sent to said nonvolatile memory device and forwarding said signal to said nonvolatile memory device when said central processing system of said computer system is operating in a system management mode as indicated by said system management mode signal, and an address decoder designed to indicate protected addresses and non-protected addresses, wherein said signal is a command signal for data stored in the non-protected address, and wherein said circuit is further designed to allow said command signal for data stored in said non-protected address to be forwarded to said nonvolatile memory device even if said central processing unit of said computer system is not operating in said system management mode.

2. The apparatus of claim 1, wherein said signal is a write command signal.

3. The apparatus of claim 1, wherein said signal is a read command signal.

4. The apparatus of claim 1, wherein said signal is an output command signal.

5. The apparatus of claim 1, wherein said signal is a read command signal for data stored in the protected address.

6. The apparatus of claim 1, wherein said signal is an output command signal for data stored in the protected address.

7. The apparatus of claim 1, wherein said signal is a write command signal for data stored in the protected address.

8. The apparatus of claim 1, wherein said signal is a read command signal for data stored in the non-protected address.

9. The apparatus of claim 1, wherein said signal is an output command signal for data stored in the non-protected address.

10. The apparatus of claim 1, wherein said signal is a write command signal for data stored in a non-protected address.

11. An apparatus for limiting access to a nonvolatile memory device in a computer system, said apparatus comprising:

a first circuit responsive to a system management mode indicator from a central processing unit in said computer system, said first circuit comprising logical elements functioning as an interface to said nonvolatile memory device, said logical elements in said first circuit forwarding a write command signal to said nonvolatile memory device only if said central processing unit of said computer system is operating in a system management mode as indicated by said system management mode signal, and a second circuit comprising logical elements functioning as an interface to said nonvolatile memory device, said logic elements in said second circuit forwarding a read command signal to said nonvolatile memory device only if said central processing unit of said computer system is operating in an system management mode as indicated by said system management.

12. The apparatus of claim 11, wherein said second circuit further comprises an address decoder designed to indicate protected addresses and non-protected addresses.

13. The apparatus of claim 12, wherein said second circuit forwards said read command signal for data stored in a protected address to said nonvolatile memory device only if said central processing unit of said computer system is operating in said system management mode.

14. The apparatus of claim 13, wherein said second circuit forwards said read command signal for data stored in a non-protected address to said nonvolatile memory device regardless of whether said central processing unit of said computer system is operating in said system management mode.

15. The apparatus of claim 12, wherein said first circuit and said second circuit are interconnected to forward said write command signal for data stored in a non-protected address to said nonvolatile memory device regardless of whether said central processing unit of said computer system is operating in said system management mode.

16. A method of limiting access to a nonvolatile memory device comprising the steps of:

intercepting a signal being sent to said nonvolatile memory device, monitoring a system management mode indicator signal from a central processing unit of a computer system to determine whether said central processing unit is operating in a system management mode, allowing said signal to be forwarded to said nonvolatile memory device only if said central processing unit of said computer system is operating in said system management mode as indicated by said system management mode indicator signal, determining whether said signal is for data stored in a protected address or a non-protected address, and allowing said signal to be forwarded to said nonvoltaile memory device regardless of whether said central processing unit of said computer system is operating in said system management mode only if said signal is for data stored in said non-protected address.

17. The method of claim 16, wherein said signal is a write command signal.

18. The method of claim 16, wherein said signal is a read command signal.

* * * * *